US012214747B2

United States Patent
Cosentino et al.

(10) Patent No.: US 12,214,747 B2
(45) Date of Patent: *Feb. 4, 2025

(54) CLOUD-BASED KEYLESS ENTRY SYSTEM

(71) Applicant: Red Hat, Inc., Raleigh, NC (US)

(72) Inventors: Andrea Cosentino, Milan (IT); Paolo Antinori, Milan (IT)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/203,826

(22) Filed: May 31, 2023

(65) Prior Publication Data
US 2023/0303032 A1   Sep. 28, 2023

Related U.S. Application Data

(63) Continuation of application No. 17/513,554, filed on Oct. 28, 2021, now Pat. No. 11,731,585.

(51) Int. Cl.
*B60R 25/24* (2013.01)
*B60R 25/01* (2013.01)
(Continued)

(52) U.S. Cl.
CPC .............. *B60R 25/24* (2013.01); *B60R 25/01* (2013.01); *B60R 25/33* (2013.01);
(Continued)

(58) Field of Classification Search
CPC ......... B60R 25/24; B60R 25/01; B60R 25/33; G07C 9/00309; G07C 2009/00984; H04L 9/3242; H04L 2209/84

See application file for complete search history.

(56) References Cited

U.S. PATENT DOCUMENTS 5,670,933 A      9/1997  Hayashi
10,553,058 B2 *  2/2020  Troia ................... H04L 63/1466
(Continued)

OTHER PUBLICATIONS

Glocker, et al.; A Protocol for a Secure Remote Keyless Entry System Applicable in Vehicles using Symmetric-Key Cryptography; Dec. 3, 2016; 6 pgs.
(Continued)

*Primary Examiner* — Thomas D Alunkal
(74) *Attorney, Agent, or Firm* — Kilpatrick Townsend & Stockton LLP

(57) ABSTRACT

Systems and methods for cloud-based keyless entry are generally described. In some examples, a first number is received from a vehicle. A first computing device of the vehicle may be configured to control an electronic door lock. A first unlock code may be generated using the first number. In some examples, a notification is sent to a remote entry device associated with the vehicle. A response to the notification may be received from the remote entry device. In some examples, the first number may be retrieved from a messaging service based at least in part on the receiving the response to the notification. A second unlock code may be generated using the first number. A determination may be made that the first unlock code matches the second unlock code. An instruction may be sent to the first computing device, the instruction effective to cause unlock of the electronic door lock.

20 Claims, 8 Drawing Sheets

(51) Int. Cl.
    *B60R 25/33*         (2013.01)
    *G07C 9/00*         (2020.01)
    *H04L 9/32*         (2006.01)

(52) U.S. Cl.
    CPC ........ *G07C 9/00309* (2013.01); *H04L 9/3242* (2013.01); *G07C 2009/00984* (2013.01); *H04L 2209/84* (2013.01)

(56) References Cited

U.S. PATENT DOCUMENTS

| | | | |
|---|---|---|---|
| 10,701,067 B1 * | 6/2020 | Ziraknejad | H04W 12/63 |
| 10,749,680 B1 * | 8/2020 | Troia | B60R 25/24 |
| 11,145,148 B2 * | 10/2021 | Troia | G07C 9/00309 |
| 11,521,442 B2 * | 12/2022 | Lerner | G07C 9/00309 |
| 11,731,585 B2 * | 8/2023 | Cosentino | H04L 9/3242 |
| | | | 340/5.72 |
| 2011/0270772 A1 | 11/2011 | Hall et al. | |
| 2014/0165675 A1 * | 6/2014 | Morita | E05B 77/44 |
| | | | 70/256 |
| 2016/0075307 A1 | 3/2016 | Jakobsson | |
| 2022/0250583 A1 | 8/2022 | Garg et al. | |

OTHER PUBLICATIONS

Green et al.; Timestamp-based Defense Mechanism Against Replay Attack in Remote Keyless Entry Systems; Jan. 2020; 4 pgs; IEEE Intl Conference on Consumer Electronics.

U.S. Appl. No. 17/737,279 , "Non-Final Office Action", Oct. 23, 2024, 7 pages.

\* cited by examiner

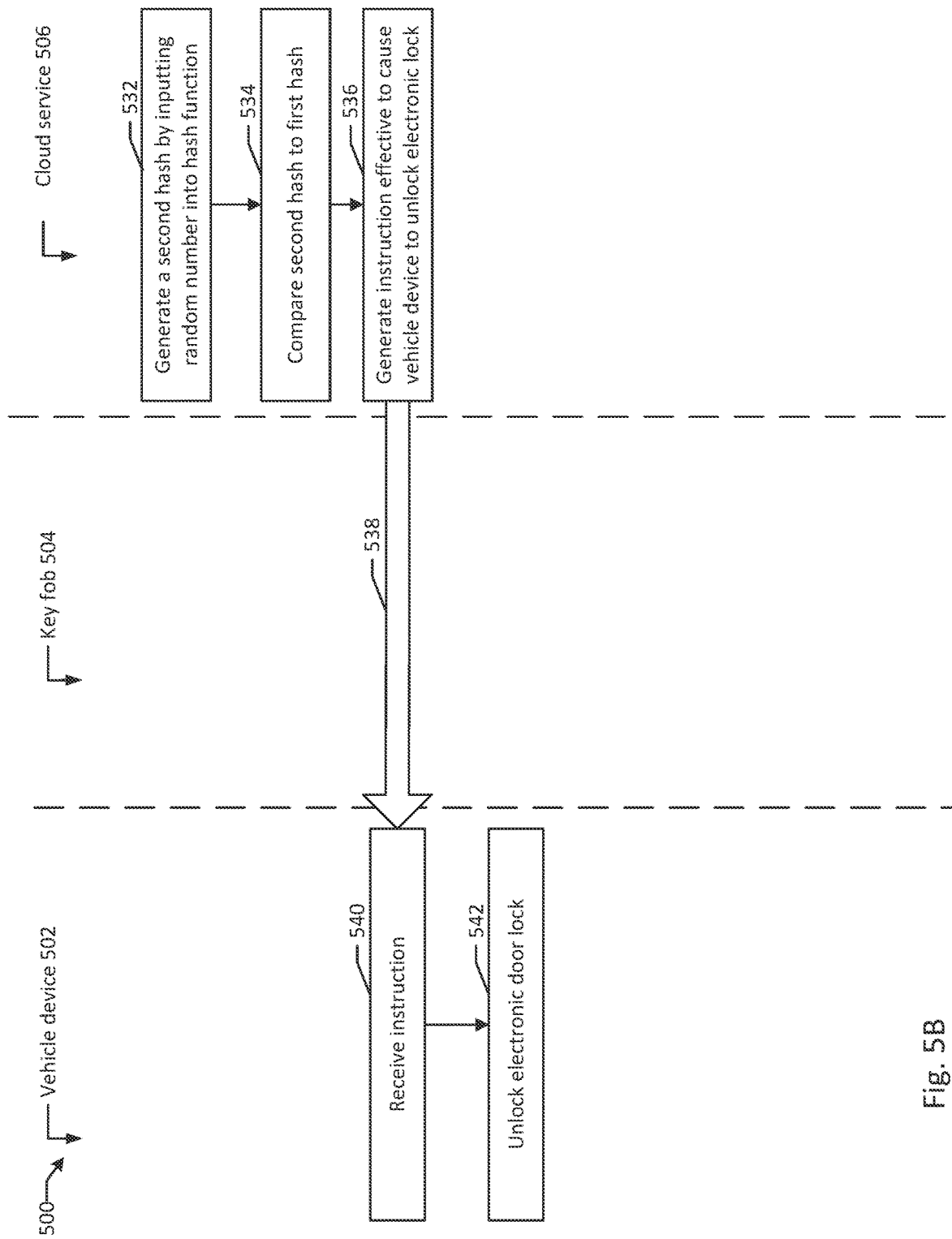

CLOUD-BASED KEYLESS ENTRY SYSTEM

CROSS-REFERENCE TO RELATED APPLICATIONS

This application is a continuation of and claims priority to U.S. patent application Ser. No. 17/513,554, filed Oct. 28, 2021, now U.S. Patent No. 11,731,585. The disclosure of the foregoing application is incorporated herein by reference in its entirety.

BACKGROUND

The present disclosure generally relates to authentication between computing devices and secure remote entry control systems for vehicles. Authentication, encryption, and secure communication techniques are used by many different kinds of computing devices to prevent third party devices from reading communications between the computing devices and/or gaining unauthorized access. Limiting the number of messages that are encrypted with the same encryption key, over time, helps reduce the risk of a successful cryptanalysis brute-force attack.

SUMMARY

The present disclosure provides a new and innovative system, methods and apparatus for keyless entry systems. In an example, a method that may be used to provide keyless entry to a locked vehicle is generally described. In various examples, a first number may be received from a vehicle, wherein a first computing device of the vehicle is configured to control an electronic door lock. In some cases, a first unlock code may be generated using the first number. In various examples, a notification may be sent to a remote entry device associated with the vehicle. In various other examples, a response to the notification may be received from the remote entry device. In various cases, the first number may be retrieved from a messaging service based at least in part on the receiving the response to the notification. In some examples, a second unlock code may be generated using the first number. In various examples, a determination may be made that the first unlock code matches the second unlock code. In various cases, an instruction may be sent to the first computing device, the instruction effective to cause unlock of the electronic door lock.

In another example, a system to provide keyless entry to a locked vehicle is generally described. In some examples, the system may comprise at least one processor. In various further examples, the system may include non-transitory computer-readable memory storing instructions that, when executed by the at least one processor, are configured to receive, from a first computing device associated with a vehicle, a first number, wherein the first computing device is configured to control an electronic door lock of a door associated with the vehicle. In various cases, the non-transitory computer-readable memory may store further instructions that, when executed by the at least one processor, are configured to generate a first unlock code using the first number. In various other examples, the non-transitory computer-readable memory may store further instructions that, when executed by the at least one processor, are further configured to send a notification to a remote entry device associated with the vehicle. In some cases, the non-transitory computer-readable memory may store further instructions that, when executed by the at least one processor, are further configured to receive a response to the notification from the remote entry device. In some other examples, the non-transitory computer-readable memory may store further instructions that, when executed by the at least one processor, are further configured to retrieve the first number from a messaging service based at least in part on the receipt of the response to the notification. In various other examples, the non-transitory computer-readable memory may store further instructions that, when executed by the at least one processor, are further configured to generate a second unlock code using the first number. In yet other examples, the non-transitory computer-readable memory may store further instructions that, when executed by the at least one processor, are further configured to determine that the first unlock code matches the second unlock code. In still further examples, the non-transitory computer-readable memory may store further instructions that, when executed by the at least one processor, are further configured to send an instruction to the first computing device, the instruction effective to cause the first computing device to unlock the electronic door lock.

In yet another example, another method to provide keyless entry to a locked vehicle is generally described. In some examples, the method may include receiving, by a remote entry device, an input unlock request to unlock an electronic door lock of a vehicle, wherein the electronic door lock is controlled by a first computing device. In various cases, the method may include sending the unlock request to the first computing device. In some other examples, the method may include generating, by the first computing device in response to the unlock request, a first number using a number generator. In other cases, the method may include sending the first number to a first cloud service, wherein the first cloud service is configured to generate a first unlock code using the first number and store the first number and the first unlock code in non-transitory computer-readable memory. In still other examples, the method may include receiving, by the remote entry device from the first cloud service, a notification. In further examples, the method may include causing, by the remote entry device in response to the notification, the first cloud service to retrieve the first number from the non-transitory computer-readable memory, wherein the first cloud service is further configured to generate a second unlock code using the first number and determine that the first unlock code matches the second unlock code. In some other examples, the method may include receiving, by the first computing device, an instruction from the first cloud service. In still other cases, the method may include unlocking, by the first computing device, the electronic door lock in response to the instruction.

Additional features and advantages of the disclosed methods, devices, and/or systems are described in, and will be apparent from, the following Detailed Description and the Figures.

BRIEF DESCRIPTION OF THE FIGURES

FIGS. 5A, 5B illustrate a flow diagram of communication between a vehicle device, a key fob, and a cloud service to provide keyless entry according to various aspects of the present disclosure.

DETAILED DESCRIPTION OF EXAMPLE EMBODIMENTS

Figure 1:
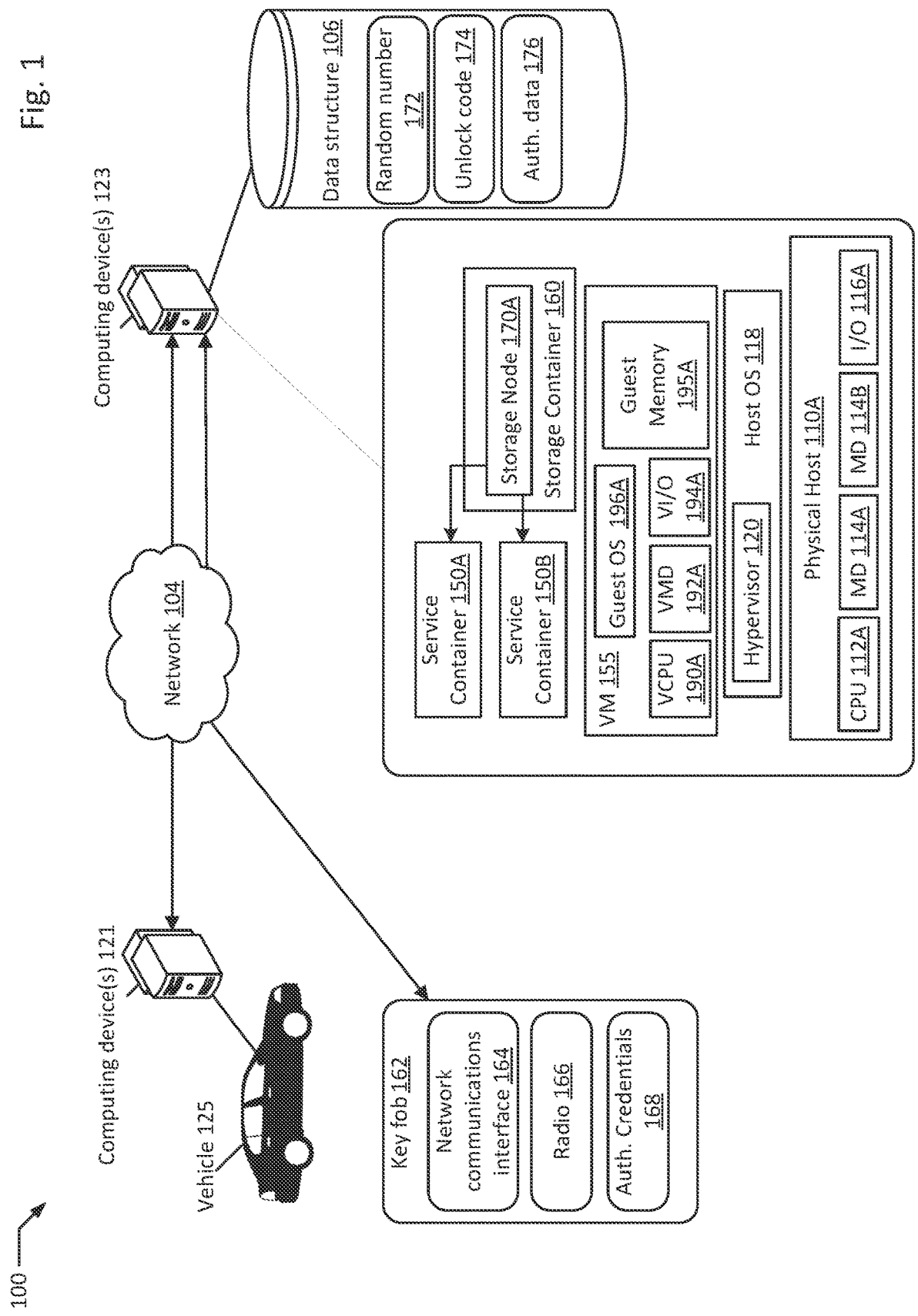
FIG. 1 is a block diagram of a computer communication system, according to various examples of the present disclosure.

Keyless entry systems enable authorized individuals to gain access to secure environments without use of a key that mechanically interfaces with a physical lock. For example, many modern vehicles have "key fobs," which are small electronic devices that include a transmitter that are effective to transmit an unlock code to a vehicle system when a user presses an unlock button on the key fob. A system in the vehicle receives and verifies the unlock code transmitted by the key fob. If the code is valid, the vehicle system performs the appropriate requested action (e.g., locking or unlocking one or more vehicle doors, starting the engine, opening the trunk, etc.). Vehicle key fobs often communicate with vehicle control systems using radio frequency (RF) signals.

Many vehicle manufacturers employ a keyless entry authentication system that is referred to as a "rolling codes" approach. The intention of the rolling codes approach is to prevent "replay attacks" in which an attacker captures the radio frequency signal transmitted by the key fob, and replays the signal to the vehicle at a later time to gain unauthorized entry to the vehicle. The rolling codes approach employs a synchronized starting code (e.g., a "seed" code that is generated using a random number generator or a pseudo-random number generator) that is provided to both the vehicle system (e.g., an electronic control unit (ECU)) and the key fob during manufacture by the original equipment manufacturer (OEM) and/or during a "pairing" step when the key fob is paired with the vehicle system. Once the key fob and the vehicle system are paired (e.g., once they have the same seed code), an algorithm (e.g., a cryptographic function) takes the initial seed number (x) as input, and outputs the next code in a sequence of codes (e.g., x+1). For example, a key press on the key fob (e.g., to unlock the vehicle) causes the key fob to retrieve the previous code from memory (e.g., x in the case of the first unlock command after pairing with the vehicle system) and generates a new code using the cryptographic function (e.g., x+1). The new code is transmitted to the vehicle system. The vehicle system verifies the new code by inputting the previous code (x, in the current example) into the cryptographic function to independently generate the new code (x+1) and verifies that the received code and the independently-generated code match.

Typically, the key fob and the vehicle system each generate a list of such codes (e.g., 255 codes) in order to prevent the key fob and the vehicle system from going out of sync. Otherwise, synchronization could be lost when a user presses the key fob button when the key fob is out of range with respect to the vehicle system (i.e., when the key fob generates and transmits the subsequent code x+1, but the vehicle system does not receive the code). This would require the user to again hit the key fob when in range of the vehicle system, resulting in the key fob generating the code x+2, but the vehicle system, having not received code x+1 from the key fob, would generate code x+1, an un-matching code. Accordingly, in this example, the devices are rendered out-of-sync. To prevent this scenario, each device may generate a list of codes and store the list in memory. In order to maintain synchronization, upon receipt of a valid key press code (by the vehicle system from the key fob) and an acknowledgement message (by the key fob from the vehicle system), each device updates the list to be x (e.g., 255) iterations from the valid key press code. This procedure prevents traditional "replay attacks" because once a valid code is used, it is invalidated by the vehicle system. Accordingly, even if the code is intercepted by an attacker, it is no longer valid following the first use.

However, there are limitations and security concerns associated with the rolling codes approach to keyless entry. First, if a user (or an attacker) obtains the key fob and presses a button a number of times that exceeds the list of valid codes while the key fob is out of range, the key fob and vehicle can become de-synchronized in what is effectively a denial-of-service (DoS) type attack. Second, an attacker may use a device with simultaneous transmit and receive capabilities to generate a jamming signal that restricts the vehicle system from receiving the valid code from the key fob. This is possible as vehicle keyless entry systems often have a receive frequency bandwidth that is wider than the bandwidth of the signal generated by the key fob. The jammer device can simultaneously intercept the rolling code from the key fob using a tighter receive band (associated with the key fob), while jamming the receiver of the vehicle system to prevent receipt by the vehicle system of the valid code. The attacker stores the intercepted code (the "first code") in memory and waits for the user to press the key fob again. When the user does so, the jammer device again intercepts the second code, stores it, and transmits the first code to the vehicle system, resulting in the vehicle being unlocked for the user. However, the attacker now possesses the second valid code and can use it later to unlock the vehicle (or perform some other relevant action) and gain unauthorized access to the vehicle. This attack can be repeated frequently by placing the jamming device near the vehicle. Note that if the user unlocks the vehicle with a mechanical key after the initial key fob press fails, that the second code capture is not required, and the first intercepted code can be used to unlock the vehicle. This attack is sometimes referred to as a "Rolljam" attack.

Described herein are various cloud-based keyless entry systems and techniques that overcome the security vulnerabilities noted above. For example, in the various embodiments described herein, no unlock codes are transmitted between the key fob and the ECU of the vehicle system. Instead, the key fob merely transmits a radio frequency invocation to the vehicle system. Upon receipt of such an invocation, the vehicle system determines whether network access (e.g., an Internet connection) is available. If not, the rolling codes approach may be used. If network access is available, the vehicle system generates a random number (or pseudo-random number) and invokes a cloud service. In various examples, the cloud service may be instantiated using a serverless function, however, any cloud-based implementation may be used in accordance with the techniques described herein. The vehicle system is authenticated by the cloud service (using authentication credentials provided to the vehicle system by the cloud service (e.g., during registration)). After successful authentication, the vehicle sends the number (e.g., the random number or pseudo-random number) to the cloud service via an encrypted and secure Internet protocol (e.g., TLS, HTTPS, etc.). The cloud service enqueues the number in a messaging protocol in association with the work flow. The work flow, in turn, may be associated with the vehicle system (e.g., using identifier data that uniquely identifies the vehicle system from among other vehicles. Any messaging protocol may be used (e.g., Apache Kafka® and/or some other asynchronous messaging protocol). Additionally, the cloud service inputs the number received from the vehicle system into a cryptographic function and generates a code. The code (e.g., a hash value) is stored in a data store associated with the vehicle system.

The cloud service next sends an indication to the key fob that is registered in association with the vehicle system. Upon receipt of the indication (e.g., a ping), the key fob connects to the cloud service and provides credentials for authentication. Upon authentication, the cloud service dequeues the messages associated with the key fob (e.g., the messages that are associated with the workflow initiated by the vehicle system) and retrieves the number from the messages. The cloud service inputs the retrieved number into the cryptographic function and generates a code. The newly-generated code (e.g., a hash value) is compared to the code stored in the data store in association with the vehicle systems. If the two codes match, the cloud service sends a message to the vehicle system that is effective to cause the vehicle system to perform the requested action (e.g., unlock the door). If the codes do not match, no action is performed. Advantageously, this approach prevents the DoS attack (since the key fob and vehicle system do not need to remain synchronized when using the cloud service) and prevents the jammer attack described above, since no valid codes are transmitted between the key fob and the vehicle system.

It should be noted that while many of the examples described herein relate to key fobs for vehicles, that the same techniques may be employed to control other types of electronic locks that may be locked/unlocked using a remote key fob. For example, the electronic lock/key fob system may be employed in a storage locker, on trigger locks for firearms, on trailers, shipping containers, controlled access areas, etc.

FIG. 1 is a block diagram of a computer communication system 100, according to various examples of the present disclosure. A vehicle 125 may include one or more embedded systems, such as one or more computing device(s) 121. In various examples, the computing device(s) 121 may include network communication hardware effective to allow the vehicle 125 to communicate over a network 104. In various examples, the computing device(s) 121 may include network communication hardware effective to allow the vehicle 125 to communicate over a network 104 (e.g., a wide area network (WAN) such as the Internet). The one or more computing device(s) 121 may comprise one or more ECUs of vehicle 125 and may control operation of different systems (e.g., electronic door locks, ignition systems, trunk locks, climate control systems, etc.) of the vehicle 125. In various examples, the computing device(s) 121 may be or may comprise the "vehicle system" (or a portion thereof) referred to herein. Vehicle 125 and/or computing device(s) 121 may comprise a radio including a transmitter and/or a receiver.

Key fob 162 may be a remote keyless entry system that is associated with vehicle 125. The key fob 162 may include a network communications interface 164 (e.g., network communications hardware) effective to enable the key fob 162 to communicate over a network 104 (e.g., the Internet or another network). Additionally, key fob 162 may comprise a radio 166 including a transmitter and/or a receiver which may enable the key fob 162 to communicate with vehicle 125 and/or computing device(s) 121 via radio frequency (e.g., for situations in which no connection to network 104 is available).

In various examples, upon receipt of a user press (or other activation) of a control on the key fob 162, the key fob may send a radio signal (and/or network communication) to the computing device(s) 121 of vehicle 125. In response, the vehicle 125 may authenticate itself to computing device(s) 123 using authentication data 176. Upon successful authentication, vehicle 125 may generate a random number 172 and may send the random number 172 to the computing device(s) 123 using a secure Internet communication protocol (e.g., HTTPS, TLS, etc.). The computing device(s) 123 may receive the random number 172 and may store the random number 172 in a data structure 106. Although not shown in FIG. 1, in various examples, the computing device(s) 123 and/or a cloud service provided by the computing device(s) 123 may send an instruction to queue the random number 172 in a message of an asynchronous messaging protocol. The message may be associated with the computing device(s) 121 and/or the key fob 162 and may only be accessible after successful authentication with the cloud service provided by computing device(s) 123. The cloud service may input the random number 172 into a cryptographic function (e.g., a hash function) and may generate an unlock code 174 (e.g., the output of the cryptographic function). The cloud service may store the unlock code 174 in the data structure 106. In various examples, the data structure 106 may be associated with the vehicle 125 and/or with the computing device(s) 121.

After generating and storing the unlock code 174, the cloud service instantiated by computing device(s) 123 may send an indication (e.g., a ping) to key fob 162. In response, the key fob 162 may authenticate itself to the cloud service using the authentication data 176 (or other authentication credentials). Upon successful authentication of the key fob 162, the cloud service may retrieve the random number 172 from the messages associated with the key fob 162. The cloud service may input the random number 172 into the cryptographic function to generate a second instance of the unlock code 174. The second instance of the unlock code 174 may be compared with the unlock code 174 which was previously generated in response to the communication with the computing device(s) 121. If the unlock codes match, the cloud service may send an instruction to the computing device(s) 121 effective to perform the requested action (e.g., unlock of one or more doors of vehicle 125).

The computing device(s) 121 and 123 may be effective to execute software that is configured to perform the various cloud-based keyless entry techniques described herein. FIG. 1 depicts example components that may be included in various implementations of computing device(s) 121 and/or computing device(s) 123. For example, computing device(s) 121 and/or computing device(s) 123 may include one or more physical host(s), including physical host 110A. Physical host 110A may in turn include one or more physical processor(s) (e.g., CPU 112A) communicatively coupled to one or more memory device(s) (e.g., MDs 114A-B) and one or more input/output device(s) (e.g., I/O 116A). As used herein, physical processor or processors 112A refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions and/or threads. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory devices 114A-B refer to volatile or non-volatile memory devices, such as RAM, ROM, EEPROM, or any other device capable of storing data. In an example, memory devices 114A may be persistent storage devices such as hard drive disks ("HDD"), solid state drives ("SSD"), and/or persistent memory (e.g., Non-Volatile Dual In-line Memory Module ("NVDIMM")). Memory devices 114A-B may additionally include replication of data to prevent against data loss due to a failure in any one device. This replication may be implemented through, for example, a redundant array of independent disks ("RAID") setup. RAID arrays may be designed to increase performance, to provide live data backup, or a combination of both. As discussed herein, I/O device(s) 116A refer to devices capable of providing an interface between one or more processor pins and an external device, the operation of which is based on the processor inputting and/or outputting binary data. CPU(s) 112A may be interconnected using a variety of techniques, ranging from a point-to-point processor interconnect, to a system area network, such as an Ethernet-based network. Local connections within physical hosts 110A, including the connections between processors 112A and memory devices 114A-B and between processors 112A and I/O device 116A may be provided by one or more local buses of suitable architecture, for example, peripheral component interconnect (PCI).

In an example, physical host 110A may run one or more isolated guests, for example, VM 155, which may in turn host additional virtual environments (e.g., VMs and/or containers). In an example, a container (e.g., storage container 160, service containers 150A-B) may be an isolated guest using any form of operating system level virtualization, for example, Red Hat® OpenShift®, Docker® containers, chroot, Linux®-VServer, FreeB SD® Jails, HP-UX® Containers (SRP), VMware ThinApp®, etc. Storage container 160 and/or service containers 150A-B may run directly on a host operating system (e.g., host OS 118) or run within another layer of virtualization, for example, in a virtual machine (e.g., VM 155). In an example, containers that perform a unified function may be grouped together in a container cluster that may be deployed together (e.g., in a Kubernetes® pod). In an example, a given service may require the deployment of multiple VMs, containers and/or pods in multiple physical locations. In an example, VM 155 may be a VM executing on physical host 110A.

Computing device(s) 121 and/or computing device(s) 123 may run one or more VMs (e.g., VMs 155), by executing a software layer (e.g., hypervisor 120) above the hardware and below the VM 155, as schematically shown in FIG. 1. In an example, the hypervisor 120 may be a component of respective host operating system 118 executed on physical host 110A, for example, implemented as a kernel based virtual machine function of host operating system 118. In another example, the hypervisor 120 may be provided by an application running on host operating system 118A. In an example, hypervisor 120 may run directly on physical host 110A without an operating system beneath hypervisor 120. Hypervisor 120 may virtualize the physical layer, including processors, memory, and I/O devices, and present this virtualization to VM 155 as devices, including virtual central processing unit ("VCPU") 190A, virtual memory devices ("VMD") 192A, virtual input/output ("VI/O") device 194A, and/or guest memory 195A. In an example, another virtual guest (e.g., a VM or container) may execute directly on host OSs 118 without an intervening layer of virtualization.

In an example, a VM 155 may be a virtual machine and may execute a guest operating system 196A which may utilize the underlying VCPU 190A, VMD 192A, and VI/O 194A. Processor virtualization may be implemented by the hypervisor 120 scheduling time slots on physical CPUs 112A such that from the guest operating system's perspective those time slots are scheduled on a virtual processor 190A. VM 155 may run on any type of dependent, independent, compatible, and/or incompatible applications on the underlying hardware and host operating system 118. The hypervisor 120 may manage memory for the host operating system 118 as well as memory allocated to the VM 155 and guest operating system 196A such as guest memory 195A provided to guest OS 196A. In an example, storage container 160 and/or service containers 150A, 150B are similarly implemented.

In an example, in addition to distributed storage provided by storage container 160, storage may be deployed in dedicated storage nodes (e.g., NAS, SAN, etc.). In an example, a storage controller may deploy storage in large logical units with preconfigured performance characteristics (e.g., storage nodes 170A). In an example, access to a given storage node (e.g., storage node 170A) may be controlled on an account and/or tenant level. In an example, a service container (e.g., service containers 150A-B) may require persistent storage for application data, and may request persistent storage with a persistent storage claim to an orchestrator (not shown). In the example, a storage controller may allocate storage to service containers 150A-B through a storage node (e.g., storage nodes 170A) in the form of a persistent storage volume. In an example, a persistent storage volume for service containers 150A-B may be allocated a portion of the storage capacity and throughput capacity of a given storage node (e.g., storage nodes 170A). In various examples, the storage container 160 and/or service containers 150A-B may deploy compute resources (e.g., storage, cache, etc.) that are part of a compute service that is distributed across multiple clusters (not shown in FIG. 1).

Figure 2:
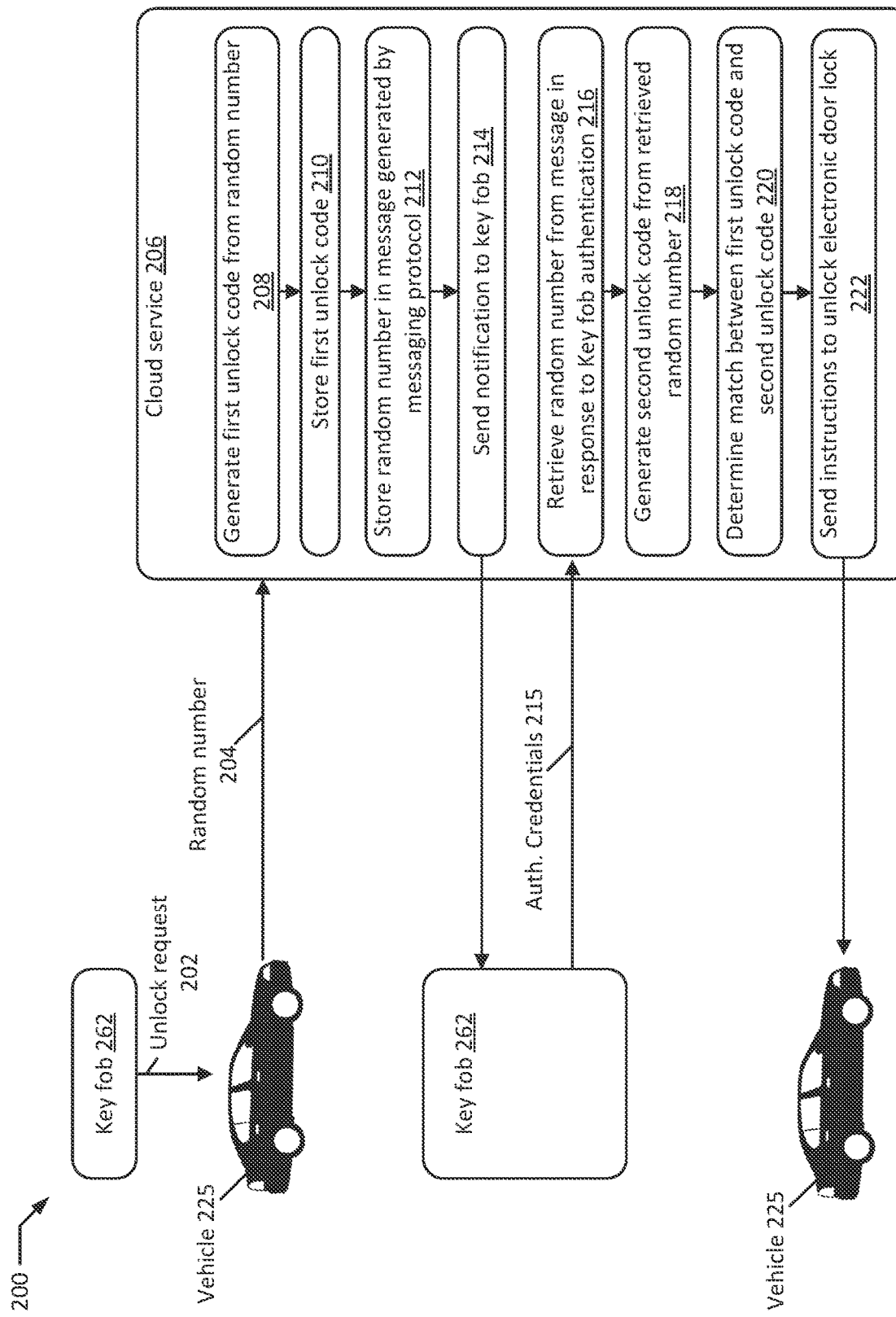
FIG. 2 is a diagram illustrating keyless entry using a cloud-based system, according to various examples of the present disclosure.

FIG. 2 is a diagram 200 illustrating keyless entry using a cloud-based system, according to various examples of the present disclosure. In various examples, key fob 262 may receive some request from a user, such as a button press, touch input, voice command, etc., representing a user request for the vehicle 225 to perform some action. For simplicity, the request may be a request from the user to unlock a door of the vehicle 225. Upon receipt of the request, the key fob 262 may determine if network access is available. If not, the key fob 262 may use a rolling codes approach to communicate with vehicle 225 to unlock the door. However, if network access is available, key fob 262 may send an unlock request 202 to the vehicle 225. The unlock request 202 may be a signal indicating that the vehicle 225 should communicate with cloud service 206 to perform the requested unlock action.

In response to receipt of the unlock request 202, vehicle 225 may check for network access. If network access is available, vehicle 225 may generate a random number 204 (which may instead be a pseudo-random number or even a predefined number). The vehicle 225 may authenticate with the cloud service 206 (e.g., by providing access credentials that were previously established during registration with the cloud service). Upon successful authentication, the random number 204 may be sent to cloud service 206 via a secure, encrypted Internet communication protocol. The cloud service 206 may generate a first unlock code from the received random number (block 208). For example, the cloud service 206 may input the received random number into a cryptographic hash function that may generate the first unlock code. The cloud service 206 may store the first unlock code in a data store associated with the vehicle 225 (block 210).

The cloud service may also store the random number in a message generated by a messaging protocol (block 212). The message may be associated with the vehicle 225 and/or the key fob 262. Accordingly, successful authentication with the cloud service 206 may be required in order to access the message. The message may be associated with a time-to-live (TTL) value. Upon expiration of the TTL, the message may be deleted, which may require the unlock procedure described in FIG. 2 to be re-initiated. The cloud service may send a notification to the key fob 262 (block 214) via the secure Internet communication protocol. Upon receipt of the notification from the cloud service 206, the key fob 262 may authenticate to the cloud service 206 (e.g., by providing authentication credentials 215). Upon successful authentication, the cloud service 206 may retrieve messages associated with the key fob 262. The cloud service 206 may retrieve the random number from the message in response to successful key fob authentication (block 216). If there are multiple valid messages, the most recent message may be used. The cloud service 206 may generate a second unlock code by inputting the random number retrieved from the message into the cryptographic hash function (block 218). The cloud service 206 may thereafter retrieve the first unlock code from the data store associated with the vehicle 225 and may compare the first unlock code and the second unlock code. The cloud service 206 may determine that the first unlock code and the second unlock code match (block 220). Thereafter, in response to the first unlock code and the second unlock code matching, the cloud service 206 may send instructions to unlock the electronic door lock of the vehicle (block 222) to the vehicle 225. The appropriate ECU of the vehicle 225 may unlock the door in response to the instructions.

Figure 3:
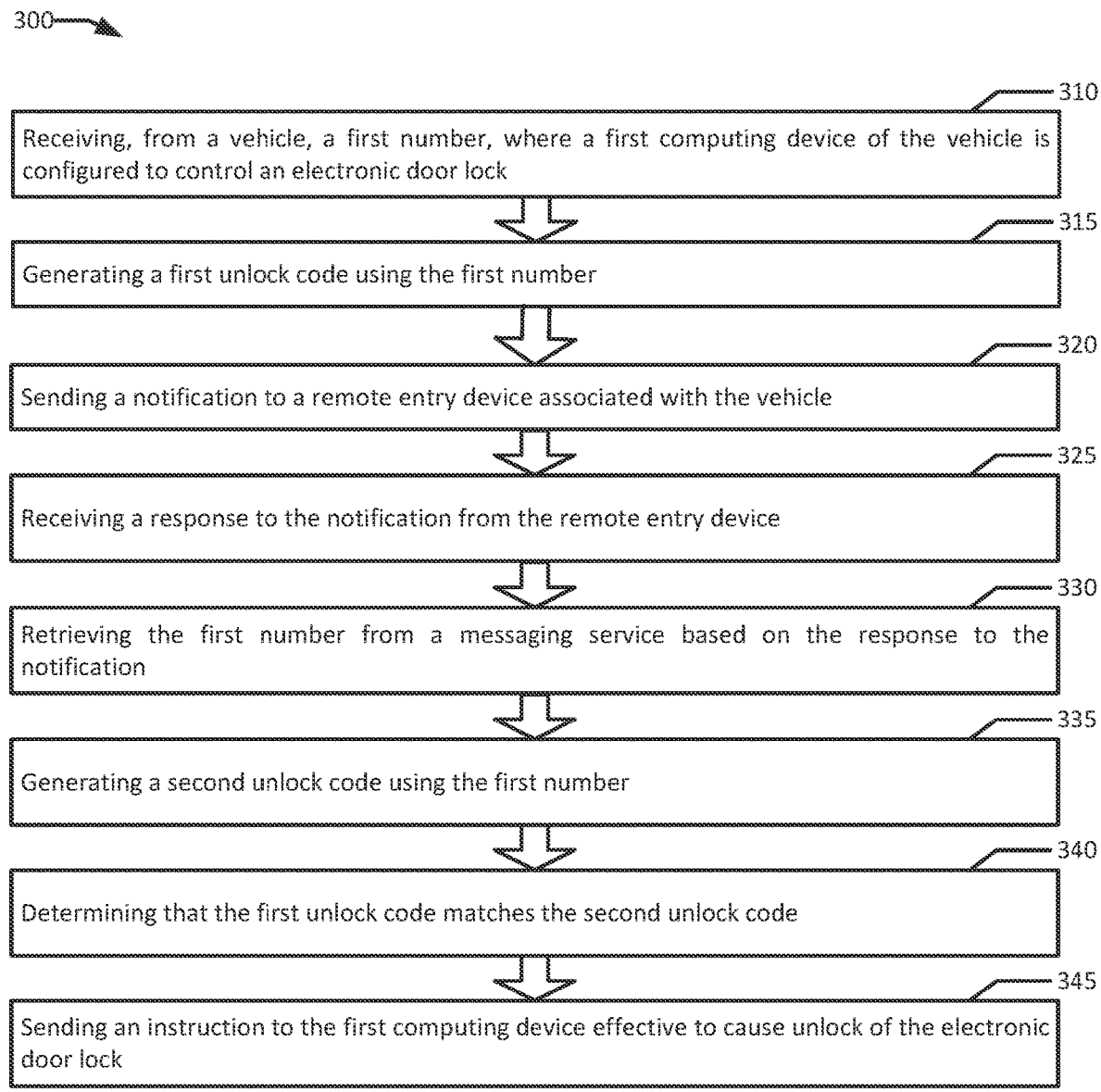
FIG. 3 is flowchart illustrating an example process for cloud-based keyless entry according to an example of the present disclosure.

FIG. 3 is flowchart illustrating an example process 300 for cloud-based keyless entry according to an example of the present disclosure. Although the example process 300 is described with reference to the flowchart illustrated in FIG. 3, it will be appreciated that many other methods of performing the acts associated with the process 300 may be used. For example, the order of some of the blocks may be changed, certain blocks may be combined with other blocks, blocks may be repeated, and some of the blocks described may be optional. The process 300 may be performed by processing logic that may comprise hardware (circuitry, dedicated logic, etc.), software, or a combination of both. In some examples, the actions described in the blocks of the process 300 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices.

The example process 300 includes receiving, from a vehicle, a first number, where a first computing device of the vehicle is configured to control an electronic door lock (block 310). For example, the first number may be generated using a random number generator or a pseudo-random number generator present in the vehicle system. The first number may be generated in response to the vehicle system receiving a radio signal (or other signal) from a key fob associated with the vehicle system. For example, the key fob may send an RF unlock request to the vehicle system. If the vehicle system recognizes the serial number (or other identifier) of the key fob, the vehicle system may generate the first number. The vehicle system may comprise an ECU that controls an electronic door lock of the vehicle. A cloud service (e.g., a serverless function and/or other service executing on one or more remote computing devices) may receive the first number. Additionally, the vehicle system may authenticate to the cloud service. In various examples, the following steps of process 300 are performed only when the vehicle system is successfully authenticated to the cloud service.

In an example, the process 300 may include generating a first unlock code using the first number (block 315). In various examples, the cloud service may input the first number into a cryptographic function (e.g., a hash function) to generate the first unlock code (e.g., a hash value). In various examples, the cloud service may send the first number to a messaging service to have a message that includes the first number generated by the messaging service. The message may only be accessed when a key fob that pertains to the vehicle system that sent the first number is successfully authenticated to the cloud service. The cloud service may store the first unlock code in a data store that is specific to the authenticated vehicle system.

In an example, the process 300 may include sending a notification to a remote entry device associated with the vehicle (block 320). For example, the cloud service may send a notification to a key fob associated with the vehicle. The notification may be data indicating that a request is pending and may cause the key fob to send authentication credentials to the cloud service in order to have the request performed.

In an example, the cloud service may receive a response to the notification from the remote entry device (block 325). In various examples, the response may include authentication credentials (e.g., data identifying the key fob and a password/secret). The response may be sent using a secure Internet communication protocol.

In an example, the process 300 may include retrieving the first number from a messaging service based on the response to the notification (block 330). For example, upon successful authentication of the remote entry device (e.g., a key fob, mobile device, etc.) the cloud service may retrieve messages from a messaging protocol (e.g., an asynchronous messaging protocol) which pertain to the authenticated remote entry device. In the current example, the message that is associated with the remote entry device includes the first number. Accordingly, the message is retrieved and the first number is obtained by the cloud service.

In an example, the process 300 may include generating a second unlock code using the first number (block 335). The cloud service, upon retrieving the first number from the message that is associated with the remote entry device, may input the retrieved first number into the same cryptographic function as was used at block 315. The cryptographic function may output the second unlock code.

In an example, the process 300 may include determining that the first unlock code matches the second unlock code (block 340). The cloud service may compare the first unlock code that was stored in a data store specific to the vehicle system with the second, independently-generated unlock code to determine if the unlock codes match.

In an example, the process 300 may include sending an instruction to the first computing device effective to cause unlock of the electronic door lock (block 345). If the first unlock code and the second unlock code match, the cloud service may send an unlock instruction to the vehicle system effective to cause the vehicle system to unlock the door lock. The unlock instruction may be encrypted and sent via a secure Internet communication protocol.

Figure 4:
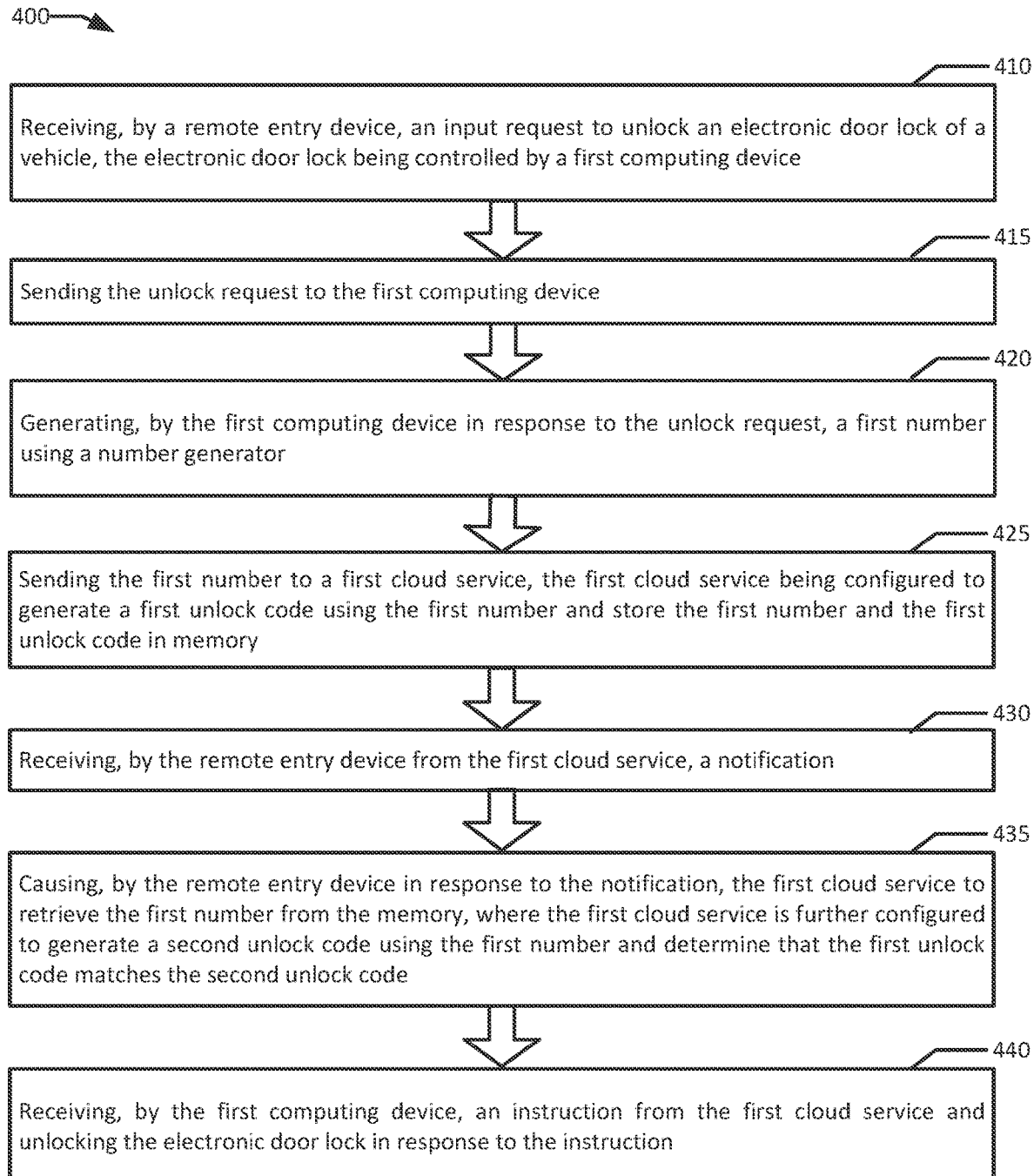
FIG. 4 is flowchart illustrating an example another example process for cloud-based keyless entry according to an example of the present disclosure.

FIG. 4 is flowchart illustrating an example another example process 400 for cloud-based keyless entry according to an example of the present disclosure. Although the example process 400 is described with reference to the flowchart illustrated in FIG. 4, it will be appreciated that many other methods of performing the acts associated with the process 400 may be used. For example, the order of some of the blocks may be changed, certain blocks may be combined with other blocks, blocks may be repeated, and some of the blocks described may be optional. The process 400 may be performed by processing logic that may comprise hardware (circuitry, dedicated logic, etc.), software, or a combination of both. In some examples, the actions described in the blocks of the process 400 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices.

The example process 400 includes receiving, by a remote entry device, an input request to unlock an electronic door lock of a vehicle, the electronic door lock being controlled by a first computing device (block 410). For example, a key fob may include an interface that enables a user to request unlock of a vehicle associated with the key fob. For example, the user may push a button, employ a haptic interface, use a voice command, etc., to request unlock of the vehicle.

The example process 400 may include sending the unlock request to the first computing device (block 415). In various examples, the first computing device may be a computing device of a vehicle (e.g., an ECU) that may be effective to control electronic door locks of the vehicle. In various examples, the remote entry device may determine whether network access is available prior to sending the unlock request to the first computing device. The unlock request may trigger, in the first computing device of the vehicle, an unlock process, as described below.

The example process 400 may include generating, by the first computing device in response to the unlock request, a first number using a number generator (block 420). In various examples, the first computing device of the vehicle may use a pseudo-random number generator to generate a random number in response to receiving the unlock code from the remote entry device. In various examples, the first computing device may generate the first number only if network access is available. Otherwise, the first computing device may send an instruction to the remote entry device to use a rolling code technique.

The example process 400 may include sending the first number to a first cloud service, the first cloud service being configured to generate a first unlock code using the first number and store the first number and the first unlock code in memory (block 425). In various examples, the first computing device of the vehicle may authenticate to the cloud service and may thereafter send the first number (e.g., a pseudo-random number) to the first cloud service using a secure internet communication protocol. In various examples, the first number may be encrypted. After successful authentication, the first cloud service may input the first number into a cryptographic function to generate a first unlock code. The first cloud service may store the first unlock code in memory that is specific to the authenticated vehicle system. In addition, the first cloud service may store the first number in memory that is associated with the remote entry device (and with the vehicle system). For example, the cloud service may provide the first number to an asynchronous messaging protocol and a message that includes the first number may be generated. The message may be in a channel that is specific to the vehicle system and/or the remote entry device. Accordingly, devices may be required to successfully authenticate to the first cloud service in order to cause the first cloud service to retrieve the first number from the message.

The example process 400 may include receiving, by the remote entry device from the first cloud service, a notification (block 430). The first cloud service may send a notification, using an Internet communication protocol, to the remote entry device. The notification may trigger the remote entry device to provide authentication credentials to the first cloud service.

The example process 400 may include causing, by the remote entry device in response to the notification, the first cloud service to retrieve the first number from the memory, where the first cloud service is further configured to generate a second unlock code using the first number and determine that the first unlock code matches the second unlock code (block 435). In the example, the remote entry device (e.g., the key fob) may authenticate to the first cloud service in response to the notification received at block 430. Upon successful authentication, the first cloud service may retrieve messages that are associated with the remote entry device. The most recent message may be inspected and parsed to retrieve the first number. The first cloud service may input the first number into the cryptographic function to generate the second unlock code. The first cloud service may retrieve the previously-generated first unlock code from memory (e.g., a data store specific to the first computing device of the vehicle) and may compare the first unlock code to the second unlock code. The first cloud service may determine that the first unlock code matches the second unlock code.

The example process 400 may include receiving, by the first computing device, an instruction from the first cloud service and unlocking the electronic door lock in response to the instruction. For example, the first cloud service may send an instruction to the first computing device of the vehicle. The first computing device of the vehicle may execute the instruction which may be configured to cause the first computing device to control the electronic door lock(s) of the vehicle and unlock the lock(s).

Figure 5A:
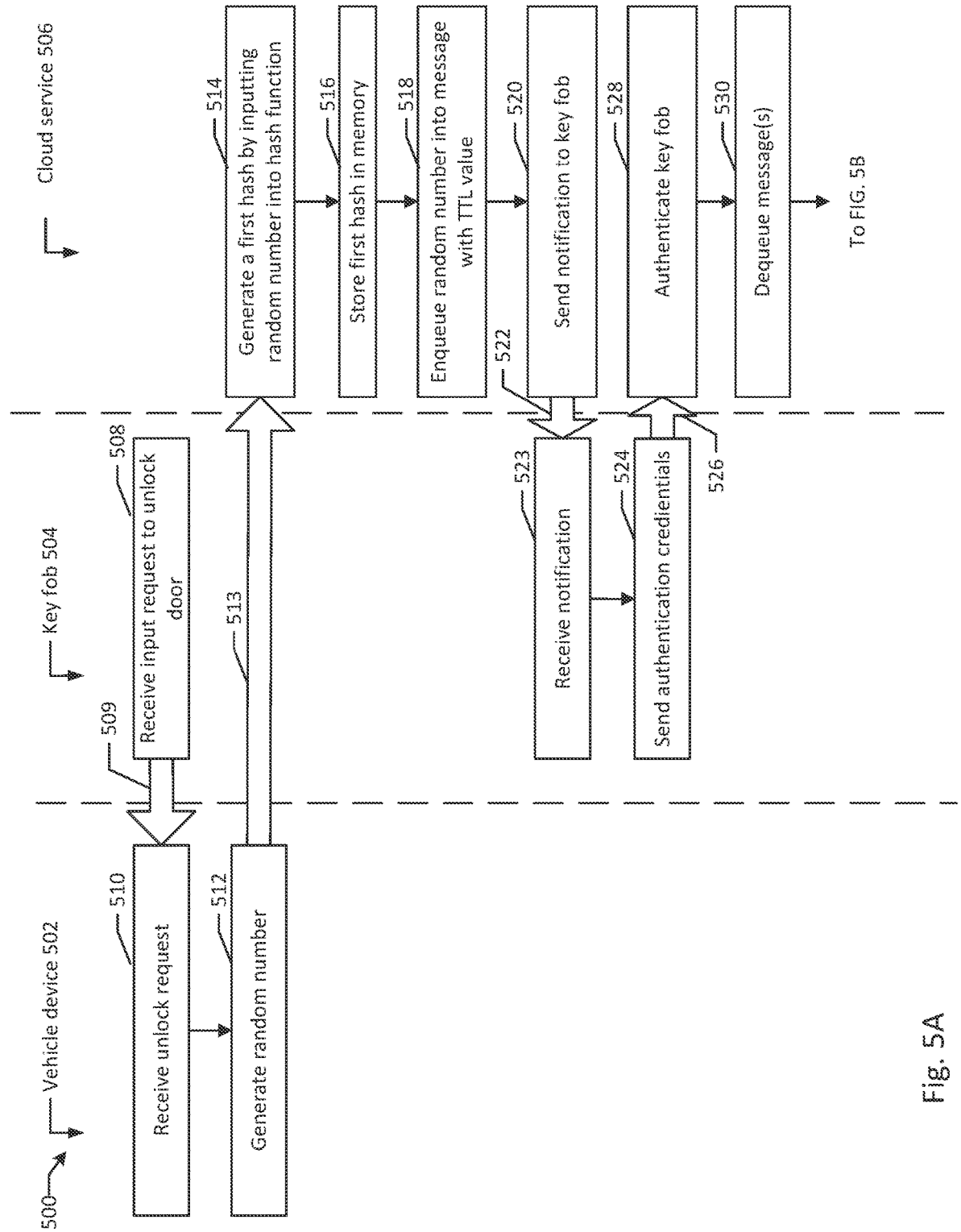

FIGS. 5A, 5B illustrate a flow diagram 500 of communication between a vehicle device, a key fob, and a cloud service to provide keyless entry according to various aspects of the present disclosure. Although the examples below are described with reference to the flow diagram illustrated in FIGS. 5A, 5B, it will be appreciated that many other methods of performing the acts associated with FIG. 5A, 5B may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both.

In the example depicted in FIGS. 5A, 5B, key fob 504 may receive an input request to unlock a vehicle door (block 508). The input request may be, for example, a button press on the key fob, a voice command, etc. The vehicle device 502 may receive unlock request 509 from the key fob 504 (block 510). The unlock request 509 may be sent via radio frequency and/or using a different communication protocol. The unlock request 509 may not include any codes, but may instead merely indicate that the key fob 504 has received an unlock request. Vehicle device 502 may authenticate with cloud service 506. After successful authentication, vehicle device 502 may generate a random number (e.g., a pseudo-random number) in response to the unlock request received from the key fob (block 512). The vehicle device 502 may send the random number 513 to cloud service 506 using a secure Internet communication protocol. Cloud service 506 may generate a first hash by inputting the random number 513 into a hash function (block 514). For example, the hash function may be a cryptographic hash function configured to take numerical input in order to generate an unlock code (e.g., a hash). The cloud service 506 may store the first hash in memory (block 516). The memory may be a data store that is specific to the vehicle device 502.

The cloud service 506 may enqueue the random number into a message with a TTL value (block 518). For example, the cloud service 506 may use a messaging protocol to generate a message that includes the random number 513. The message may be specific to the vehicle device 502 and the key fob 504. The TTL value may define a time period. After the time period elapses, the random number may be deleted. The cloud service 506 may send a notification 522 to the key fob 504 (block 520). The notification 522 may be sent via the secure Internet communication protocol. The key fob 504 may receive the notification 522 (block 523). The notification 522 may be effective to trigger the key fob 504 to send authentication credentials 526 to the cloud service 506 (block 524). The cloud service 506 may authenticate the key fob 504 (block 528) using the authentication credentials 526. In response to successful authentication of the key fob 504, the cloud service 506 may dequeue the message(s) that are associated with the key fob 504 using the messaging protocol (block 530) (e.g., by communicating with a message broker of the messaging protocol).

In the example, the cloud service 506 may generate a second hash by inputting the random number into the hash function (block 532). For example, the random number retrieved from the message may be input into the cryptographic hash function to generate a second hash (e.g., a second unlock code). The cloud service 506 may compare the second hash to the first hash (block 534). The cloud service 506 may determine that the first hash and the second hash match. The cloud service 506 may generate an instruction 538 effective to cause the vehicle device 502 to unlock an electronic lock (block 536). The cloud service 506 may send the instruction 538 via the secure Internet communication protocol to the vehicle device 502. The vehicle device 502 may receive the instruction 538 (block 540). The vehicle device 502 may unlock the electronic door lock in response to the instruction 538 (block 542). For example, the vehicle device 502 may use an ECU to control the electronic door lock.

Figure 6:
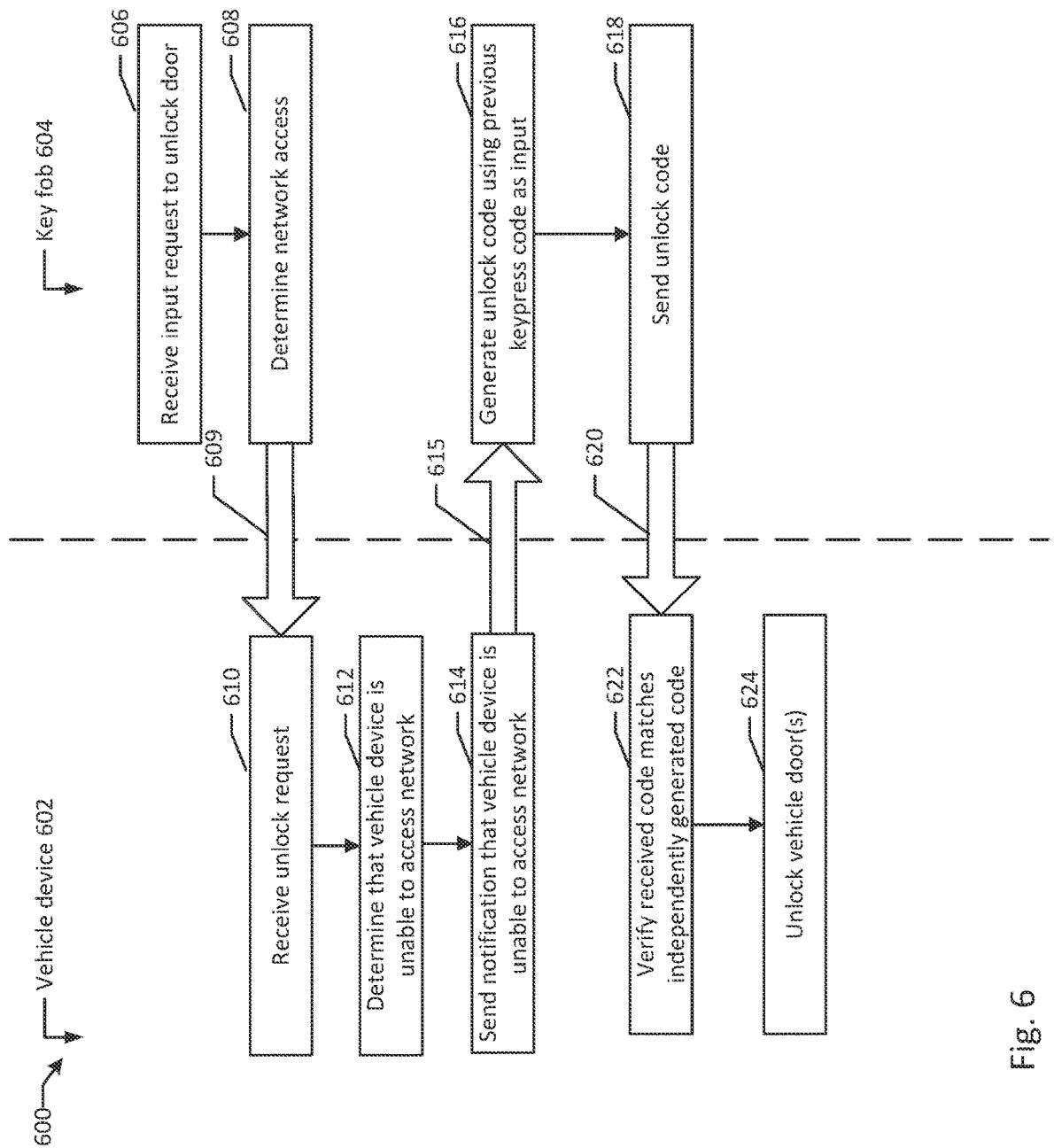
FIG. 6 illustrates a flow diagram of decision logic for keyless entry when a network connection is not present in accordance with various aspects of the present disclosure.

FIG. 6 illustrates a flow diagram 600 of decision logic for keyless entry when a network connection is not present in accordance with various aspects of the present disclosure. Although the examples below are described with reference to the flow diagram illustrated in FIG. 6, it will be appreciated that many other methods of performing the acts associated with FIG. 6 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both.

In the illustrated example flow diagram 600, key fob 604 may receive an input request to unlock a vehicle door (block 606). The input request may be, for example, a button press on the key fob, a voice command, etc. The key fob 604 may determine whether there is network access (e.g., Internet access) (block 608). In the current example, the key fob 604 may determine that a network connection is present. The key fob 604 may send the unlock request 609 to the vehicle device 602.

The vehicle device 602 may receive unlock request 609 from the key fob 604 (block 610). The unlock request 609 may be sent via radio frequency and/or using a different communication protocol. The unlock request 609 may not include any codes, but may instead merely indicate that the key fob 604 has received an unlock request. The vehicle device 602 may determine that the vehicle device 602 is unable to access the network (block 612). For example, the vehicle device 602 may not currently have an Internet connection. Vehicle device 602 may send a notification 615 to the key fob 604 indicating that the vehicle device is unable to access the network (block 614). For example, the notification 615 may be sent via an RF signal. The key fob 604 may generate an unlock code using a previous keypress code as input (block 616). In this example, the key fob 604 and the vehicle device 602 may be paired using a rolling codes approach. The key fob 604 may send the unlock code 620 to the vehicle device 602 (block 618). The vehicle device 602 may receive the unlock code 620 and may verify that the received code matches an independently-generated code (block 622). For example, the vehicle device 602 may input the previous code into a cryptographic function and may determine if the output code matches the unlock code 620 received from the key fob 604. If the codes match, the vehicle device 602 may unlock the vehicle door(s) (block 624). In addition, the vehicle device 602 may mark the code as used thereby invalidating the code from further use (to prevent replay attacks).

Figure 7:
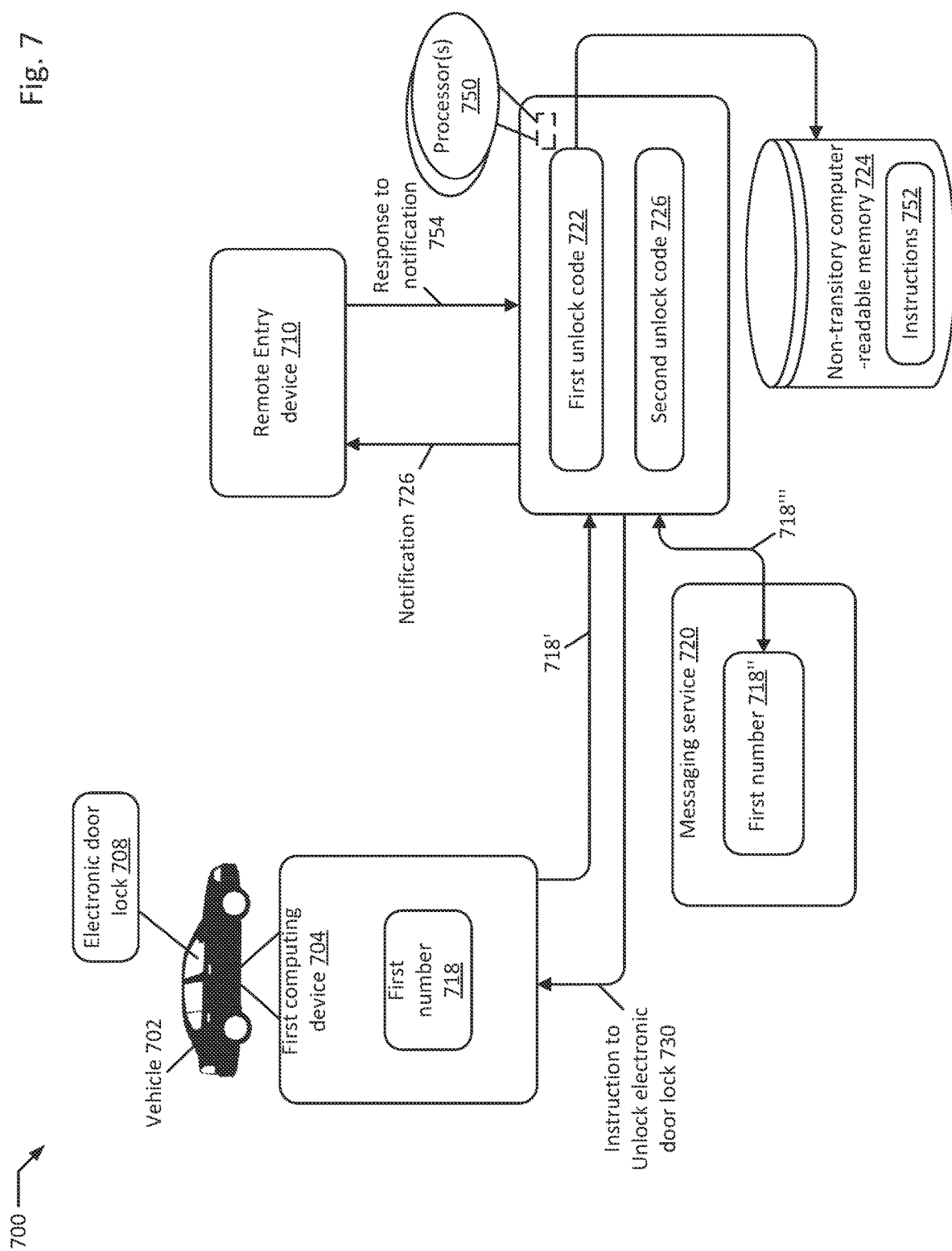
FIG. 7 is block diagram of an example system for cloud-based keyless entry according to an example of the present disclosure.

FIG. 7 is block diagram of an example system 700 for cloud-based keyless entry according to an example of the present disclosure. The system 700 may include one or more processors 750 and non-transitory computer-readable memory 724. The non-transitory computer-readable memory 724 may comprise instructions 752. The instructions 752, when executed by the one or more processors 750 may be effective to cause first cloud service to receive, from first computing device 704 associated with vehicle 702, first number 718. The first computing device 704 may be configured to control electronic door lock 708 of vehicle 702. The first cloud service may generate first unlock code 722 using the first number 718'.

The first cloud service may send a notification 726 to a remote entry device 710 that is associated with vehicle 702. For example, remote entry device 710 may be a key fob for vehicle 702. The first cloud service may receive a response to the notification 754 from the remote entry device 710. The first cloud service may retrieve the first number 718″ from a messaging service 720 based at least in part on the receipt of the response to the notification 754. The first cloud service may generate a second unlock code 726 using the first number 718‴. The first cloud service may determine that the first unlock code 722 matches the second unlock code 726. The first cloud service may send an instruction 730 to the first computing device 704, the instruction 730 effective to cause the first computing device 704 to unlock the electronic door lock 708.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st example aspect of the present disclosure, a method comprises receiving, from a vehicle, a first number, wherein a first computing device of the vehicle is configured to control an electronic door lock; generating a first unlock code using the first number; sending a notification to a remote entry device associated with the vehicle; receiving a response to the notification from the remote entry device; retrieving the first number from a messaging service based at least in part on the receiving the response to the notification; generating a second unlock code using the first number; determining that the first unlock code matches the second unlock code; and sending an instruction to the first computing device, the instruction effective to cause unlock of the electronic door lock.

In accordance with a 2nd example aspect of the present disclosure, which may be used in combination with any one or more of other aspects described herein (e.g., the 1st aspect), the method further comprising: further comprising: receiving, from the first computing device, authentication credentials using a secure network communication protocol; and authenticating the first computing device using the authentication credentials.

In accordance with a 3rd example aspect of the present disclosure, which may be used in combination with any one or more of other aspects described herein (e.g., the 1st aspect), the method further comprising: identifying authentication credentials included in the response to the notification from the remote entry device, wherein the response is sent using a secure network communication protocol; authenticating the remote entry device; and retrieving the first number from the messaging service further based on the authentication of the remote entry device.

In accordance with a 4th example aspect of the present disclosure, which may be used in combination with any one or more of other aspects described herein (e.g., the 1st aspect), the method further comprising generating the first unlock code by inputting the first number into a hash function, wherein the first unlock code comprises a hash.

In accordance with a 5th example aspect of the present disclosure, which may be used in combination with any one or more of other aspects described herein (e.g., the 1st aspect), the method further comprising: providing the first number to the messaging service; and retrieving the first number from the messaging service further based on authentication of the remote entry device.

In accordance with a 6th example aspect of the present disclosure, which may be used in combination with any one or more of other aspects described herein (e.g., the 1st aspect), retrieving a plurality of messages from the messaging service; determining an order of the plurality of messages using timestamps of the plurality of messages; determining a most recent message of the plurality of messages based on the order; and reading the first number from the most recent message.

In accordance with a 7th example aspect of the present disclosure, which may be used in combination with any one or more of other aspects described herein (e.g., the 1st aspect), receiving first data indicating a global positioning system (GPS) region associated with the vehicle; receiving, from the first computing device, a current GPS location of the vehicle; and determining that the current GPS location of the vehicle is within the GPS region, wherein the instruction effective to cause the first computing device to unlock the electronic door lock is generated based at least in part on the determination that the current GPS location of the vehicle is within the GPS region.

In accordance with an 8th example aspect of the present disclosure, which may be used in combination with any one or more of other aspects described herein (e.g., the 1st aspect), receiving, from a second computing device associated with an owner of the vehicle, data effective to deny unlock requests received from the first computing device.

In accordance with a 9th example aspect of the present disclosure, which may be used in combination with any one or more of other aspects described herein (e.g., the 1st aspect), wherein the first computing device is configured to determine, in response to receiving the unlock request from the remote entry device, that network access is available, wherein the first number is generated in response to the network access being available.

In accordance with a 10th example aspect of the present disclosure, which may be used in combination with any one or more of other aspects described herein (e.g., the 1st aspect), wherein the remote entry device is further configured to: receive a second input request to unlock the electronic door lock; determine that network access is unavailable; generate a code value using a first code function; and send the code value to the first computing device, wherein the first computing device is effective to verify the code value and unlock the electronic door lock.

Aspects of the subject matter described herein may be useful alone or in combination with one or more other aspects described herein. In a 11th example aspect of the present disclosure, a system comprises: at least one processor; and non-transitory computer-readable memory storing instructions that, when executed by the at least one processor, are configured to: receive, from a first computing device associated with a vehicle, a first number, wherein the first computing device is configured to control an electronic door lock of a door associated with the vehicle; generate a first unlock code using the first number; send a notification to a remote entry device associated with the vehicle; receive a response to the notification from the remote entry device; retrieve the first number from a messaging service based at least in part on the receipt of the response to the notification; generate a second unlock code using the first number; determine that the first unlock code matches the second unlock code; and send an instruction to the first computing device, the instruction effective to cause the first computing device to unlock the electronic door lock.

In accordance with a 12th example aspect of the present disclosure, which may be used in combination with any one or more of other aspects described herein (e.g., the 11th aspect), the non-transitory computer-readable memory storing further instructions that, when executed by the at least one processor, are further effective to: receive, from the first computing device, authentication credentials using a secure network communication protocol; and authenticate the first computing device using the authentication credentials.

In accordance with a 13th example aspect of the present disclosure, which may be used in combination with any one or more of other aspects described herein (e.g., the 11th aspect), the non-transitory computer-readable memory storing further instructions that, when executed by the at least one processor, are further effective to: identify authentication credentials included in the response to the notification from the remote entry device, wherein the response is sent using a secure network communication protocol; authenticate the remote entry device; and retrieve the first number from the messaging service further based on the authentication of the remote entry device.

In accordance with a 14th example aspect of the present disclosure, which may be used in combination with any one or more of other aspects described herein (e.g., the 11th aspect), the non-transitory computer-readable memory storing further instructions that, when executed by the at least one processor, are further effective to: provide the first number to the messaging service; and retrieve the first number from the messaging service further based on authentication of the remote entry device.

Aspects of the subject matter described herein may be useful alone or in combination with one or more other aspects described herein. In a 15th example aspect of the present disclosure, a method comprising receiving, by a remote entry device, an input unlock request to unlock an electronic door lock of a vehicle, wherein the electronic door lock is controlled by a first computing device; sending the unlock request to the first computing device; generating, by the first computing device in response to the unlock request, a first number using a number generator; sending the first number to a first cloud service, wherein the first cloud service is configured to generate a first unlock code using the first number and store the first number and the first unlock code in non-transitory computer-readable memory; receiving, by the remote entry device from the first cloud service, a notification; causing, by the remote entry device in response to the notification, the first cloud service to retrieve the first number from the non-transitory computer-readable memory, wherein the first cloud service is further configured to generate a second unlock code using the first number and determine that the first unlock code matches the second unlock code; receiving, by the first computing device, an instruction from the first cloud service; and unlocking, by the first computing device, the electronic door lock in response to the instruction.

In accordance with a 16th example aspect of the present disclosure, which may be used in combination with any one or more of other aspects described herein (e.g., the 15th aspect), further comprising sending, by the first computing device, authentication credentials to the first cloud service using a secure network communication protocol, wherein the first cloud service is configured to authenticate the first computing device.

In accordance with a 17th example aspect of the present disclosure, which may be used in combination with any one or more of other aspects described herein (e.g., the 15th aspect), further comprising: sending, by the remote entry device, authentication credentials to the first cloud service using a secure network communication protocol in response to the notification, wherein the first cloud service is configured to authenticate the remote entry device and wherein authentication of the remote entry device is configured to cause the first cloud service to retrieve the first number from the second cloud service.

In accordance with a 18th example aspect of the present disclosure, which may be used in combination with any one or more of other aspects described herein (e.g., the 15th aspect), wherein the first cloud service is configured to generate the first unlock code by inputting the first number into a hash function, wherein the first unlock code comprises a hash.

In accordance with a 19th example aspect of the present disclosure, which may be used in combination with any one or more of other aspects described herein (e.g., the 15th aspect), wherein the first cloud service retrieves the first number from the non-transitory computer-readable memory in response to authentication of the remote entry device to the first cloud service.

In accordance with a 20th example aspect of the present disclosure, which may be used in combination with any one or more of other aspects described herein (e.g., the 15th aspect), wherein the first cloud service is configured to: retrieve a plurality of messages from the non-transitory computer-readable memory; determine an order of the plurality of messages using timestamps of the plurality of messages; determine a most recent message of the plurality of messages based on the order; and read the first number from the most recent message.

In accordance with a 21st example aspect of the present disclosure, which may be used in combination with any one or more of other aspects described herein (e.g., the 15th aspect), wherein the first cloud service is configured to: receive first data indicating a global positioning system (GPS) region associated with the vehicle; receive, from the first computing device, a current GPS location of the vehicle; and determine that the current GPS location of the vehicle is within the GPS region, wherein the instruction effective to cause the first computing device to unlock the electronic door lock is generated based at least in part on the determination that the current GPS location of the vehicle is within the GPS region.

In accordance with a 22nd example aspect of the present disclosure, which may be used in combination with any one or more of other aspects described herein (e.g., the 15th aspect), wherein the first cloud service is further configured to receive, from a second computing device associated with an owner of the vehicle, data effective to deny unlock requests received from the first computing device.

In accordance with a 23rd example aspect of the present disclosure, which may be used in combination with any one or more of other aspects described herein (e.g., the 15th aspect), determining, by the first computing device in response to receiving the unlock request from the remote entry device, that network access is available, wherein the first number is generated in response to the network access being available.

In accordance with a 24th example aspect of the present disclosure, which may be used in combination with any one or more of other aspects described herein (e.g., the 15th aspect), receiving, by the remote entry device, a second input request to unlock the electronic door lock; determining, by the remote entry device, that network access is unavailable; generating, by the remote entry device, a code value using a first code function; and sending, by the remote entry device, the code value to the first computing device, wherein the first computing device is effective to verify the code value and unlock the electronic door lock.

Aspects of the subject matter described herein may be useful alone or in combination with one or more other aspects described herein. In a 25th example aspect of the present disclosure, a system comprises: a first computing device deployed in a vehicle, the first computing device configured to control an electronic door lock of a door associated with the vehicle; a remote entry device configured to communicate wirelessly with the first computing device deployed in the vehicle, wherein the remote entry device is configured to: receive an input request to unlock the electronic door lock; and send an unlock request to the first computing device; the first computing device configured to: generate a first number using a number generator in response to the unlock request; send the first number to a first cloud service, wherein the first cloud service is configured to: generate a first unlock code using the first number; store the first unlock code in a first data store; and send a notification to the remote entry device; the remote entry device further configured to: cause the first cloud service to retrieve the first number from a second cloud service; and wherein the first cloud service is further configured to: receive the first number from the second cloud service; generate a second unlock code using the first number; determine that the first unlock code matches the second unlock code; and send an instruction to the first computing device, the instruction effective to cause the first computing device to unlock the electronic door lock; and the first computing device further configured to unlock the electronic door lock in response to the instruction.

In accordance with a 26th example aspect of the present disclosure, which may be used in combination with any one or more of other aspects described herein (e.g., the 25th aspect), wherein the first computing device is further configured to: send authentication credentials to the first cloud service using a secure network communication protocol, wherein the first cloud service is configured to authenticate the first computing device.

In accordance with a 27th example aspect of the present disclosure, which may be used in combination with any one or more of other aspects described herein (e.g., the 25th aspect), wherein the remote entry device is further configured to: send authentication credentials to the first cloud service using a secure network communication protocol in response to the notification, wherein the first cloud service is configured to authenticate the remote entry device and wherein authentication of the remote entry device is configured to cause the first cloud service to retrieve the first number from the second cloud service.

In accordance with a 28th example aspect of the present disclosure, which may be used in combination with any one or more of other aspects described herein (e.g., the 25th aspect), wherein the first cloud service is configured to generate the first unlock code by inputting the first number into a hash function, wherein the first unlock code comprises a hash.

In accordance with a 29th example aspect of the present disclosure, which may be used in combination with any one or more of other aspects described herein (e.g., the 25th aspect), wherein the second cloud service is an asynchronous messaging service, and wherein the first cloud service is further configured to provide the first number to the asynchronous message service, wherein the first cloud service retrieves the first number from the second cloud service in response to authentication of the remote entry device to the first cloud service.

In accordance with a 30th example aspect of the present disclosure, which may be used in combination with any one or more of other aspects described herein (e.g., the 25th aspect), wherein the first cloud service is configured to: retrieve a plurality of messages from the second cloud service; determine an order of the plurality of messages using timestamps of the plurality of messages; determine a most recent message of the plurality of messages based on the order; and read the first number from the most recent message.

In accordance with a 31st example aspect of the present disclosure, which may be used in combination with any one or more of other aspects described herein (e.g., the 25th aspect), wherein the first cloud service is further configured to: receive first data indicating a global positioning system (GPS) region associated with the vehicle; receive, from the first computing device, a current GPS location of the vehicle; and determine that the current GPS location of the vehicle is within the GPS region, wherein the instruction effective to cause the first computing device to unlock the electronic door lock is generated based at least in part on the determination that the current GPS location of the vehicle is within the GPS region.

In accordance with a 32nd example aspect of the present disclosure, which may be used in combination with any one or more of other aspects described herein (e.g., the 25th aspect), wherein the first cloud service is further configured to receive, from a second computing device associated with an owner of the vehicle, data effective to deny unlock requests received from the first computing device.

In accordance with a 33rd example aspect of the present disclosure, which may be used in combination with any one or more of other aspects described herein (e.g., the 25th aspect), the first computing device being further configured to: determine, in response to receiving the unlock request from the remote entry device, that network access is available, wherein the first number is generated in response to the network access being available.

In accordance with a 34th example aspect of the present disclosure, which may be used in combination with any one or more of other aspects described herein (e.g., the 25th aspect), the remote entry device being further configured to: receive a second input request to unlock the electronic door lock; determine that network access is unavailable; generate a code value using a first code function; and send the code value to the first computing device, wherein the first computing device is effective to verify the code value and unlock the electronic door lock.

Aspects of the subject matter described herein may be useful alone or in combination with one or more other aspects described herein. In a 35th example aspect of the present disclosure, a system comprises: a means for receiving, from a first computing device associated with a vehicle, a first number, wherein the first computing device is configured to control an electronic door lock of a door associated with the vehicle; a means for generating a first unlock code using the first number; a means for storing the first unlock code in a first data store; a means for sending a notification to a remote entry device associated with the vehicle; a means for receiving a response to the notification from the remote entry device; a means for retrieving the first number from a messaging service based at least in part on the receiving the response to the notification; a means for generating a second unlock code using the first number; a means for determining that the first unlock code matches the second unlock code; and a means for sending an instruction to the first computing device, the instruction effective to cause the first computing device to unlock the electronic door lock.

In accordance with a 36th example aspect of the present disclosure, which may be used in combination with any one or more of other aspects described herein (e.g., the 35th aspect), further comprising: a means for receiving, from the first computing device, authentication credentials using a secure network communication protocol; and a means for authenticating the first computing device using the authentication credentials.

In accordance with a 37th example aspect of the present disclosure, which may be used in combination with any one or more of other aspects described herein (e.g., the 35th aspect), a means for identifying authentication credentials included in the response to the notification from the remote entry device, wherein the response is sent using a secure network communication protocol; a means for authenticating the remote entry device; and a means for retrieving the first number from the messaging service further based on the authentication of the remote entry device.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
receiving, by at least one processor from a vehicle, a first number, wherein a first computing device of the vehicle is configured to control an electronic door lock;
generating, by the at least one processor, a first unlock code using the first number;
generating, by the at least one processor, a second unlock code based at least in part on communication with a remote entry device associated with the vehicle, wherein the at least one processor compares the first unlock code to the second unlock code; and
sending an instruction to the first computing device, the instruction effective to cause unlock of the electronic door lock, wherein the instruction is sent based at least in part on the first unlock code matching the second unlock code.

2. The method of claim 1, further comprising:
sending a notification to the remote entry device;
receiving a response to the notification from the remote entry device; and
retrieving the first number from a messaging service based at least in part on the receiving the response to the notification.

3. The method of claim 2, further comprising:
generating the second unlock code using the first number; and
determining, by the at least one processor, that the first unlock code matches the second unlock code.

4. The method of claim 1, further comprising:
receiving, from the first computing device, authentication credentials using a secure network communication protocol; and
authenticating the first computing device using the authentication credentials.

5. The method of claim 1, further comprising:
sending a notification to the remote entry device;
receiving a response to the notification from the remote entry device;
identifying authentication credentials included in the response to the notification from the remote entry device, wherein the response is sent using a secure network communication protocol;
authenticating the remote entry device; and
retrieving the first number from a messaging service further based on the authentication of the remote entry device.

6. The method of claim 1, further comprising generating the first unlock code by inputting the first number into a hash function, wherein the first unlock code comprises a hash.

7. The method of claim 1, further comprising:
providing the first number to a messaging service; and
retrieving the first number from the messaging service further based on authentication of the remote entry device.

8. The method of claim 1, further comprising:
retrieving a plurality of messages from a messaging service;
determining an order of the plurality of messages using timestamps of the plurality of messages;
determining a most recent message of the plurality of messages based on the order; and
reading the first number from the most recent message.

9. The method of claim 1, further comprising receiving, from a second computing device associated with an owner of the vehicle, data effective to deny unlock requests received from the first computing device.

10. The method of claim 1, wherein the first computing device is configured to determine, in response to receiving an unlock request from the remote entry device, that network access is available, wherein the first number is generated in response to the network access being available.

11. A system comprising:
at least one processor; and
non-transitory computer-readable memory storing instructions that, when executed by the at least one processor, are configured to:
receive, from a first computing device associated with a vehicle, a first number, wherein the first computing device is configured to control an electronic door lock of a door associated with the vehicle;
generate a first unlock code using the first number;
generate a second unlock code based at least in part on communication with a remote entry device associated with the vehicle, wherein the at least one processor compares the first unlock code with the second unlock code; and
send an instruction to the first computing device, the instruction effective to cause the first computing device to unlock the electronic door lock, wherein the instruction is sent based at least in part on the first unlock code matching the second unlock code.

12. The system of claim 11, the non-transitory computer-readable memory storing further instructions that, when executed by the at least one processor, are further effective to:
  send a notification to the remote entry device;
  receive a response to the notification from the remote entry device; and
  retrieve the first number from a messaging service based at least in part on the receipt of the response to the notification.

13. The system of claim 12, the non-transitory computer-readable memory storing further instructions that, when executed by the at least one processor, are further effective to:
  generate a second unlock code using the first number; and
  determine that the first unlock code matches the second unlock code.

14. The system of claim 11, the non-transitory computer-readable memory storing further instructions that, when executed by the at least one processor, are further effective to:
  receive, from the first computing device, authentication credentials using a secure network communication protocol; and
  authenticate the first computing device using the authentication credentials.

15. The system of claim 11, the non-transitory computer-readable memory storing further instructions that, when executed by the at least one processor, are further effective to:
  send a notification to the remote entry device;
  receive a response to the notification from the remote entry device;
  identify authentication credentials included in the response to the notification from the remote entry device, wherein the response is sent using a secure network communication protocol;
  authenticate the remote entry device; and
  retrieve the first number from a messaging service further based on the authentication of the remote entry device.

16. The system of claim 11, the non-transitory computer-readable memory storing further instructions that, when executed by the at least one processor, are further effective to:
  provide the first number to a messaging service; and
  retrieve the first number from the messaging service further based on authentication of the remote entry device.

17. A non-transitory computer-readable memory storing instructions that, when executed by at least one processor, cause the at least one processor to:
  receive, from a first computing device associated with a vehicle, a first number, wherein the first computing device is configured to control an electronic door lock of a door associated with the vehicle;
  generate a first unlock code using the first number;
  generate a second unlock code based at least in part on communication with a remote entry device associated with the vehicle, wherein the at least one processor compares the first unlock code with the second unlock code; and
  send an instruction to the first computing device, the instruction effective to cause the first computing device to unlock the electronic door lock, wherein the instruction is sent based at least in part on the first unlock code matching the second unlock code.

18. The non-transitory computer-readable memory of claim 17, wherein the instructions, when executed by the at least one processor, further cause the at least one processor to:
  send a notification to the remote entry device;
  receive a response to the notification from the remote entry device; and
  retrieve the first number from a messaging service based at least in part on the receipt of the response to the notification.

19. The non-transitory computer-readable memory of claim 17, wherein the instructions, when executed by the at least one processor, further cause the at least one processor to:
  generate a second unlock code using the first number; and
  determine that the first unlock code matches the second unlock code.

20. The non-transitory computer-readable memory of claim 17, wherein the instructions, when executed by the at least one processor, further cause the at least one processor to:
  receive, from the first computing device, authentication credentials using a secure network communication protocol; and
  authenticate the first computing device using the authentication credentials.

* * * * *